United States Patent
Hofbauer et al.

(10) Patent No.: US 9,482,145 B2
(45) Date of Patent: Nov. 1, 2016

(54) TOROIDAL COMBUSTION CHAMBER WITH SIDE INJECTION

(71) Applicant: EcoMotors, Inc., Allen Park, MI (US)

(72) Inventors: Peter Hofbauer, West Bloomfield, MI (US); Robert Levy, Dryden, MI (US); Diana Brehob, Dearborn, MI (US)

(73) Assignee: EcoMotors, Inc., Allen Park, MI (US)

( * ) Notice: Subject to any disclaimer, the term of this patent is extended or adjusted under 35 U.S.C. 154(b) by 924 days.

(21) Appl. No.: 13/707,651

(22) Filed: Dec. 7, 2012

(65) Prior Publication Data
US 2013/0146021 A1     Jun. 13, 2013

Related U.S. Application Data

(60) Provisional application No. 61/568,787, filed on Dec. 9, 2011.

(51) Int. Cl.
    *F02B 17/00*     (2006.01)
    *F02B 23/06*     (2006.01)

(52) U.S. Cl.
    CPC ......... *F02B 17/005* (2013.01); *F02B 23/0663* (2013.01); *F02B 23/0684* (2013.01); *Y02T 10/125* (2013.01)

(58) Field of Classification Search
CPC .............. F02F 3/26; F02F 2/28; F02F 3/285; F02F 1/26; F02F 1/10; F02F 2001/241; F02B 23/0663; F02B 23/0684; F02B 23/0696
USPC ....... 123/279, 281–290, 193.1, 193.5, 193.3, 123/193.6, 193.4
See application file for complete search history.

(56) References Cited

U.S. PATENT DOCUMENTS

| | | | | |
|---|---|---|---|---|
| 2,256,776 A | * | 9/1941 | George | F02B 19/04 123/256 |
| 2,396,429 A | * | 3/1946 | Krygsman | F02B 45/02 123/51 B |
| 2,682,862 A | * | 7/1954 | Hilding | F02B 3/00 123/276 |
| 2,840,059 A | * | 6/1958 | Buchi | F01L 1/285 123/262 |
| 3,270,721 A | * | 9/1966 | Hideg | F02B 17/005 123/256 |
| 3,954,089 A | * | 5/1976 | Hardesty | F02B 23/0624 123/261 |
| 3,999,532 A | * | 12/1976 | Kornhauser | F02B 19/108 123/263 |
| 4,052,972 A | * | 10/1977 | Mizunuma | F02B 19/04 123/193.5 |
| 4,090,479 A | * | 5/1978 | Kaye | F02B 25/08 123/306 |
| 4,164,913 A | * | 8/1979 | Komiyama | F02B 23/0651 123/193.6 |
| 4,164,915 A | * | 8/1979 | Kulhavy | F02B 19/04 123/259 |
| 4,311,122 A | * | 1/1982 | Banba | F02B 23/0696 123/279 |

(Continued)

*Primary Examiner* — Thomas Moulis
(74) *Attorney, Agent, or Firm* — Barnes & Thornburg LLP

(57) ABSTRACT

A toroidal combustion chamber shape with side injectors is being developed for an opposed-piston engine. Favorable combustion characteristics of such configuration are transferred to a conventional engine, i.e., one with a combustion chamber delimited by a piston, a cylinder wall, and a cylinder head. At least one injector is disposed in the cylinder head at the periphery. The fuel is injected substantially along the plane of interface between the cylinder head and the cylinder block. The intake system is configured to provide a swirling flow in the combustion chamber. The fuel is injected in an angle that is displaced from the central axis of the cylinder and directed along the swirl. In some embodiments, a substantially torus-shaped volume is formed between the piston and the cylinder head when the piston is at top center. The injector or injectors spray fuel into the toroidally-shaped volume substantially tangent to the torus.

15 Claims, 5 Drawing Sheets

(56) References Cited

U.S. PATENT DOCUMENTS

| | | | | |
|---|---|---|---|---|
| 4,562,807 A * | 1/1986 | Matsui | F02B 23/0621 | 123/260 |
| 4,586,465 A * | 5/1986 | Krogdahl | F02B 19/04 | 123/193.6 |
| 4,616,612 A * | 10/1986 | Jane | F02B 23/0651 | 123/276 |
| 4,779,587 A * | 10/1988 | Schweinzer | F02B 23/0672 | 123/263 |
| 4,840,147 A * | 6/1989 | Tanahashi | F02B 25/145 | 123/193.5 |
| 4,872,433 A * | 10/1989 | Paul | F02B 23/02 | 123/257 |
| 4,898,135 A * | 2/1990 | Failla | F02B 21/02 | 123/193.6 |
| 4,974,554 A * | 12/1990 | Emery | F02B 41/04 | 123/197.3 |
| 5,024,194 A * | 6/1991 | Shinzawa | F02B 23/04 | 123/269 |
| 5,042,441 A * | 8/1991 | Paul | F01B 7/14 | 123/257 |
| 5,115,776 A * | 5/1992 | Ohno | F02B 1/08 | 123/276 |
| 5,117,789 A * | 6/1992 | Merritt | F02B 19/04 | 123/289 |
| 5,398,653 A * | 3/1995 | Merritt | F02B 19/04 | 123/292 |
| 5,417,189 A * | 5/1995 | Regueiro | F02B 19/14 | 123/262 |
| 5,505,172 A * | 4/1996 | Heitland | F02B 25/04 | 123/257 |
| 5,794,584 A * | 8/1998 | Gillespie | F02B 19/04 | 123/257 |
| 6,035,823 A * | 3/2000 | Koike | F02B 23/104 | 123/276 |
| 6,216,662 B1 * | 4/2001 | Sapsford | F02B 23/104 | 123/276 |
| 6,443,122 B1 * | 9/2002 | Denbratt | F02B 23/104 | 123/276 |
| 6,799,551 B2 * | 10/2004 | Nakakita | F02B 23/0621 | 123/279 |
| 6,892,695 B2 * | 5/2005 | Schmitz | F02B 17/005 | 123/279 |
| 7,353,797 B1 * | 4/2008 | Breidenthal | F02B 19/04 | 123/263 |
| 7,987,833 B2 * | 8/2011 | Cho | F02B 17/00 | 123/279 |
| 8,056,531 B2 * | 11/2011 | Xu | F02B 23/104 | 123/280 |
| 8,251,040 B2 * | 8/2012 | Jang | F02B 23/104 | 123/276 |
| 8,402,940 B2 * | 3/2013 | Straub | F02B 23/0624 | 123/301 |
| 8,677,950 B2 * | 3/2014 | Hofbauer | F01B 7/08 | 123/306 |
| 8,800,528 B2 * | 8/2014 | Fuqua | F01B 7/02 | 123/299 |
| 2008/0115769 A1 * | 5/2008 | Mason | F01L 1/38 | 123/48 B |
| 2012/0073541 A1 * | 3/2012 | Fuqua | F01B 7/02 | 123/301 |
| 2013/0087117 A1 * | 4/2013 | Vaseleniuck | F01L 7/16 | 123/197.4 |
| 2013/0213342 A1 * | 8/2013 | Burton | F02F 3/26 | 123/193.6 |

* cited by examiner

TOROIDAL COMBUSTION CHAMBER WITH SIDE INJECTION

CROSS REFERENCE TO RELATED APPLICATIONS

The present application claims priority benefit from U.S. provisional patent application 61/568,787 filed 9 Dec. 2011.

FIELD OF INVENTION

The present disclosure relates to shape of the combustion chamber and injector orientation in internal combustion engines.

BACKGROUND

Thermal efficiency and engine-out emissions from an internal combustion engine are determined by many factors including the combustion system design and the mechanical design. Combustion system design includes combustion chamber shape, the fuel injection nozzle, and the fuel injection pressure, intake manifold and exhaust manifold, etc. All of these together are optimized to achieve mixing quality that leads to effective combustion.

An unconventional engine that is being developed to exploit its high power density and other positive characteristics is an opposed-piston engine. Conventional direct-injection diesel combustion chamber geometry does not work for the opposed-piston engine because the centrally-located injector in conventional engines is not feasible in an opposed-piston engine because the combustion chamber is contained between two piston faces. In the opposed piston engine, the only position in which a conventional injector can be installed to have access to the combustion chamber is in the cylinder wall. It has been found that a toroidally-shaped combustion chamber provides a very favorable combustion characteristic. It would be desirable to obtain such desirable combustion and emission characteristics in other engine architectures.

SUMMARY

It has been found that a toroidal combustion chamber with side injection provides favorable emission characteristics in an opposed-piston engine. Such favorable characteristics may present advantages in an engine with a cylinder head. Disclosed herein is an internal combustion engine having a block defining a cylinder wall and a cylinder head affixed to the block. The cylinder head has two intake ports with first and second intake valves disposed therein and two exhaust ports with first and second exhaust valves disposed therein. The cylinder head has an intake geometry that promotes a swirl flow of gases flowing through intake ports. A piston is disposed within the cylinder wall with a central axis of the piston substantially coincident with a central axis of the cylinder wall. A top of the piston has a raised outer ring near the periphery of the piston that squishes gases inwardly toward the central axis when the piston travels toward the cylinder head. A first injector is disposed in the cylinder head at a location proximate the cylinder wall. The injector has at least one orifice through which at least one fuel jet emanates when the orifice is open. The injector is disposed in the cylinder wall with an axis of the injector angled such that a tip of the injector is pointed downward toward the block. One fuel jet exits at an angle to direct the jet upward with respect to an axis of the injector and along the direction of the swirl flow. The piston top also has a raised central region and an inner ring disposed between the raised central region and the outer ring thereby defining a substantially toroidal volume in the piston top. The piston top in the raised central region nearly meets the cylinder head when the piston is at a top center position of its travel within the cylinder wall. The intake and exhaust valves are situated in such a manner in the cylinder head to preclude accommodation of a standard fuel injector pocket in the center of the cylinder head. The standard fuel injector pocket includes a fuel injector, the material into which the injector is secured, and cooling water passages provided around the fuel injector. In some embodiments, the cylinder head has a centrally-located raised region that is substantially oval-shaped as considered in a plane parallel to a deck of the block. Alternatively, the raised region can be circular. In some embodiments, a second fuel injector is disposed in the cylinder head at a location approximately diametrically opposed from the first fuel injector. The second injector has at least one orifice through which at least one fuel jet emanates when the orifice is open. The second injector is disposed in the cylinder wall with an axis of the second injector angled such that a tip of the injector is pointed downward toward the block. One fuel jet of the second injector exits at an angle to direct the jet upward with respect to an axis of the second injector and along the direction of the swirl flow.

Also disclosed is an internal combustion engine having a block defining a cylinder wall, and a cylinder head affixed to the block. The cylinder head has at least one intake port with an intake valve disposed therein and at least one exhaust port with an exhaust valve disposed therein. The piston has three regions: a center, an outer ring near the periphery of the piston, and an inner ring that is recessed in relation to the center and outer ring. The three regions each have a geometric center that is substantially coincident with a central axis of the cylinder wall. An injector is disposed in the cylinder head proximate the cylinder wall. The injector has at least one orifice through which a fuel jet exits when the orifice is open. The fuel jet is substantially directed into the recess associated with the inner ring.

The piston is adapted to reciprocate within the cylinder wall between top center and bottom center positions. When the piston is at the top center position, the piston top and the cylinder head are displaced by a small gap in the regions of the outer ring and the center and, most of the volume between the cylinder head and the piston is within the inner ring of the piston. When the piston is at top center position, the volume between the cylinder head and the piston top is substantially a toroidal volume proximate the inner ring with a geometric center of the toroidal volume substantially coincident with the central axis of the cylinder wall.

In some embodiments, the engine also has a second fuel injector disposed in the cylinder head at a location approximately diametrically opposed from the first fuel injector. The second injector has at least one orifice through which at least one fuel jet exits when the orifice is open. The at least one fuel jet from the second injector is directed into the recess associated with the inner ring. The at least one fuel jet from the first injector is directed along a first side of the inner ring and the at least one fuel jet from the second injector is directed along a second side of the inner ring opposite from the first side. The cylinder head has two intake ports, two exhaust ports, two intake valves, and two exhaust valves. The fuel injector is disposed between adjacent valves.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
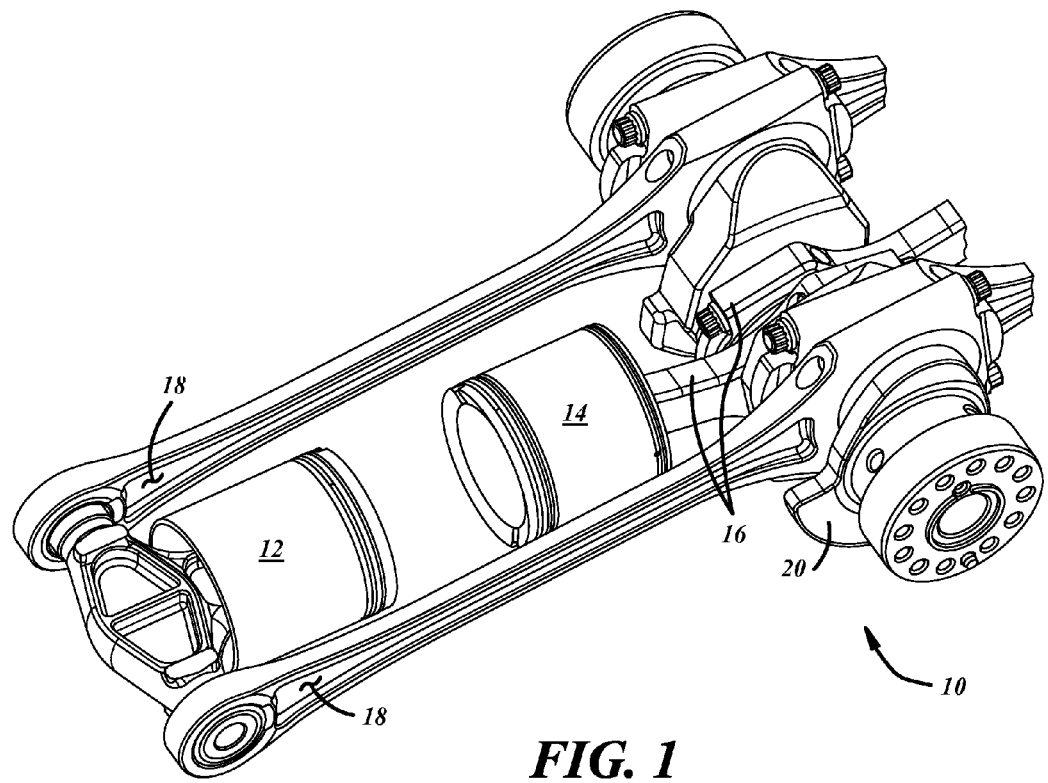
FIG. 1 is an isometric representation of a portion an OPOC engine.

An example of an opposed-piston, opposed-cylinder engine is disclosed in U.S. Pat. No. 6,170,443, which is incorporated herein by reference. An isometric representation of one end of an opposed-piston, opposed cylinder engine 10 is shown in FIG. 1. An intake piston 12 and an exhaust piston 14 reciprocate within the cylinder (not shown to facilitate viewing of the connecting rods). An exhaust piston 14 couples to a journal (not visible) of crankshaft 20 via a pushrod 16. An intake piston 12 couples to two journals (not visible) of crankshaft 20 via pullrods 18, with each intake piston 12 having two pullrods 18. The engine in FIG. 1 has a combustion chamber formed between the piston top of intake piston 12 and the piston top of exhaust piston 14 and the cylinder wall (not shown). Pistons 12 and 14 are shown are at an intermediate position in FIG. 1. Combustion is initiated when the pistons are proximate each other.

Figure 2:
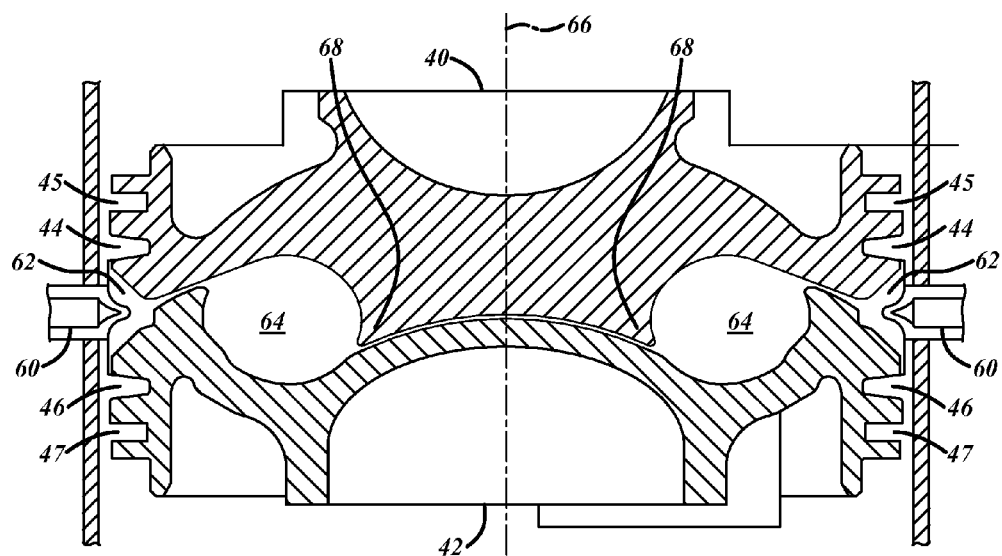
FIG. 2 is a cross section of a combustion chamber in an opposed-piston engine.

A cross-sectional representation of a combustion chamber shape that shows promise based on analytical results is shown in FIG. 2. An intake piston 40 and an exhaust piston 42 are shown at their closest position. Piston 40 has grooves 44 and 45 and piston 42 has grooves 46 and 47 to accommodate piston rings (not shown). Pistons 40 and 42 reciprocate within cylinder wall 50. The combustion chamber is the volume enclosed between the tops of pistons 40 and 42 and the cylinder wall 50. Pockets 62 are provided in cylinder wall 50. Injectors 60 pierce cylinder wall 50 leading into pockets 62.

Figure 3:
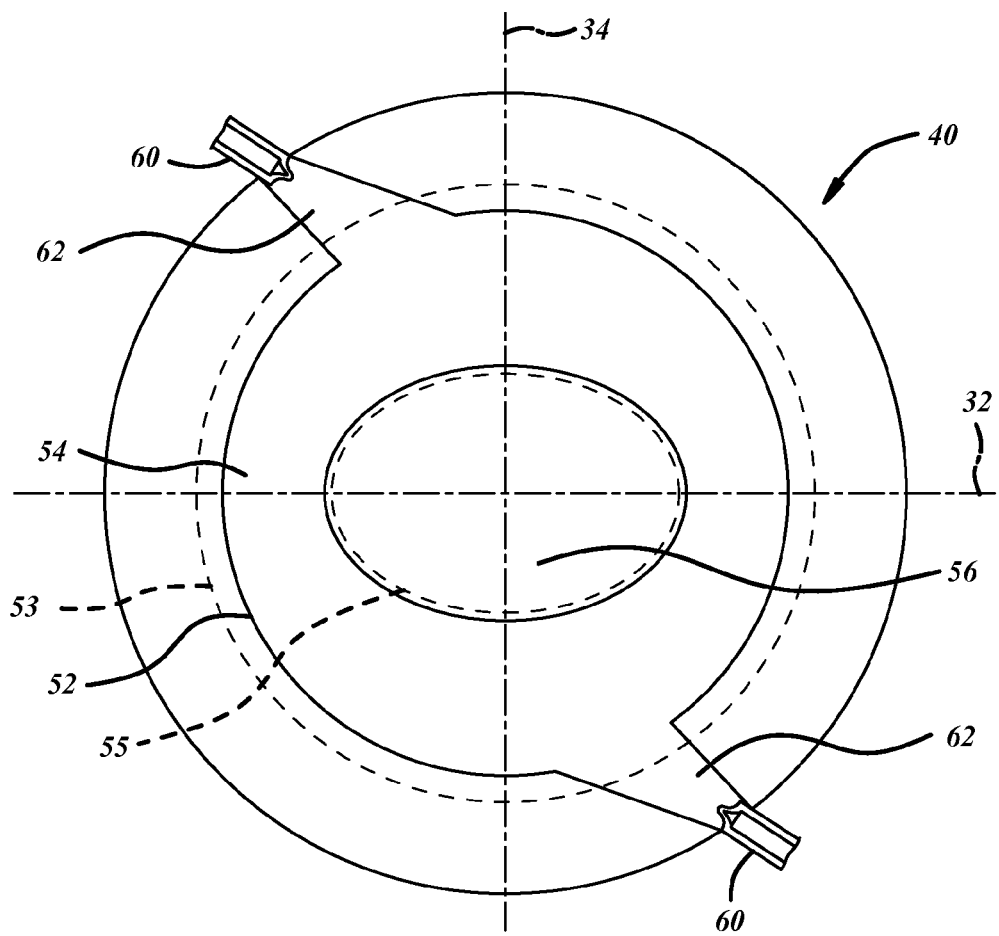
FIG. 3 is a sketch of the regions on the top of the intake piston of FIG. 2.

A top of intake piston 40 is shown in FIG. 3. The piston is shown having three regions: outer ring 52, inner ring 54, and center 56. Exhaust piston 42 has three corresponding regions: an outer ring, an inner ring, and a center. The majority of the volume of the combustion chamber, when the pistons are in close proximity, is contained in the volume between the inner ring surface of the intake piston and the inner ring surface of the exhaust piston.

The cross section of the combustion chamber volume, as shown in FIG. 2, shows two roughly oval areas 64. The shape of the combustion chamber in the inner ring region is a surface of revolution generated by revolving oval area 64 in space about a central axis 66 of cylinder 50. Strictly speaking, a torus is the result of rotating a circle around an axis. However, in the present disclosure, the term torus is used to apply to any 2-dimensional shape rotated about central axis 66. As shown in FIG. 3, the cross-sectional area of areas 64 varies slightly through the rotation about central axis 66 because center 56 is longer along horizontal axis 32 than along vertical axis 34, i.e., center 56 is ovoid. The term torus is applied to all of these variants within the present disclosure.

Figure 4:
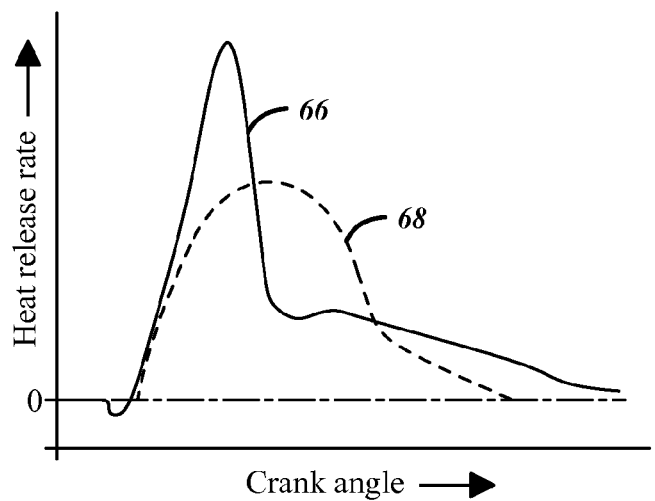
FIG. 4 is a plot of heat release for a conventional combustion chamber and an opposed-piston, toroidal combustion chamber with side injection.

A typical heat release rate curve 66 for diesel combustion is shown in FIG. 4. Initially, the heat release rate dips below zero due to the effect of the vaporization of the injected fuel. The heat release rapidly rises upon ignition, the spike commonly referred to as the premixed combustion phase and the tail in the later portion referred to as the mixing-controlled combustion phase. The premixed combustion phase is predominantly responsible for the production of NOx. The height of the premixed combustion phase may be reduced by reducing the ignition delay by using multiple injections. However, there is still a need to reduce the impact of the initial high spike in the heat release rate. Heat release rate in a combustion system such as that illustrated in FIGS. 2 and 3 is shown as dashed curve 68 in FIG. 4, which yields NOx production about one-third to one-half that of the heat release rate curve 66 for typical diesel combustion. Such a fundamental change in combustion characteristics provided by the combustion chamber shape in FIGS. 2 and 3 can be translated into a conventional engine combustion chamber as well.

Figure 5:
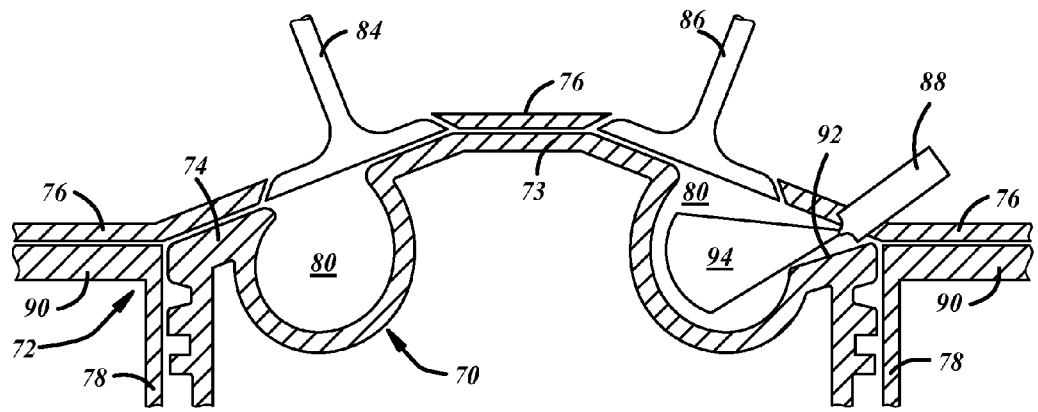
FIG. 5 is a cross section of a toroidal combustion chamber for an engine with one piston in the cylinder and a cylinder head.

A piston and cylinder head arrangement to exploit the advantages of seen in the opposed-piston configuration is illustrated in cross section in FIG. 5. A piston 70 is disposed in a block 72. Piston 70 has a squish region 74 at the periphery. When piston 70 is at its closest position to cylinder head 76, the volume in the combustion chamber is largely contained in substantially ovoid regions 80 in the piston top. The combustion chamber is defined by a cylinder wall 78, the top of piston 70, and the bottom of cylinder head 76 that opposes piston 70. The cylinder head extends beyond the cylinder wall and may cover multiple cylinders. The portion of cylinder head 76 that encloses the combustion chamber is that portion within a projection of cylinder wall 78 or, put another way, that portion that opposes the piston top. Cylinder head 76 has a plurality of ports or openings therein into which poppet valves 84, 86 are disposed. In most modern engines, two intake valves and two exhaust valves are provided. The cross section is taken so that two valves 84, 86 are illustrated. Also included in cylinder head 76 is an injector 88. It is likely, instead, that injector 88 would be installed into head 76 at a location that is rotated from the widest part of valve 86. However, simply for illustrative convenience, injector 88 is shown in the cross-sectional view in FIG. 5 as well. As injector 88 is located at the periphery of the cylinder and the typical fuel injector is centrally located, the fuel from injector 88 travels farther to reach the farthest reaches in the combustion chamber compared with a central injector. To overcome this, a second injector (not shown) can be installed in the cylinder head substantially diametrically opposed to injector 88. The axis of injector 88 is installed at an acute angle with respect to the portion of cylinder head 76 that mates with a deck 90 of block 72. Such angle is driven by the interface between deck 90 and cylinder head 76, meaning that injector 88 is installed in either head 76 or cylinder wall 78, i.e., displaced from that interface. Orifices in a tip of injector 88 are defined in a manner so that fuel jet or jets 94 exit at an angle displaced from the axis of injector 88. A pocket 92 is provided for jets 94 of injector 88 to access regions 80 in piston 70.

Although it would present other complications, in an alternative embodiment, the injector could be placed in the cylinder wall with the injector tilting upward toward the cylinder head and the jets aiming downward into regions 80 in piston 70.

Figure 6:
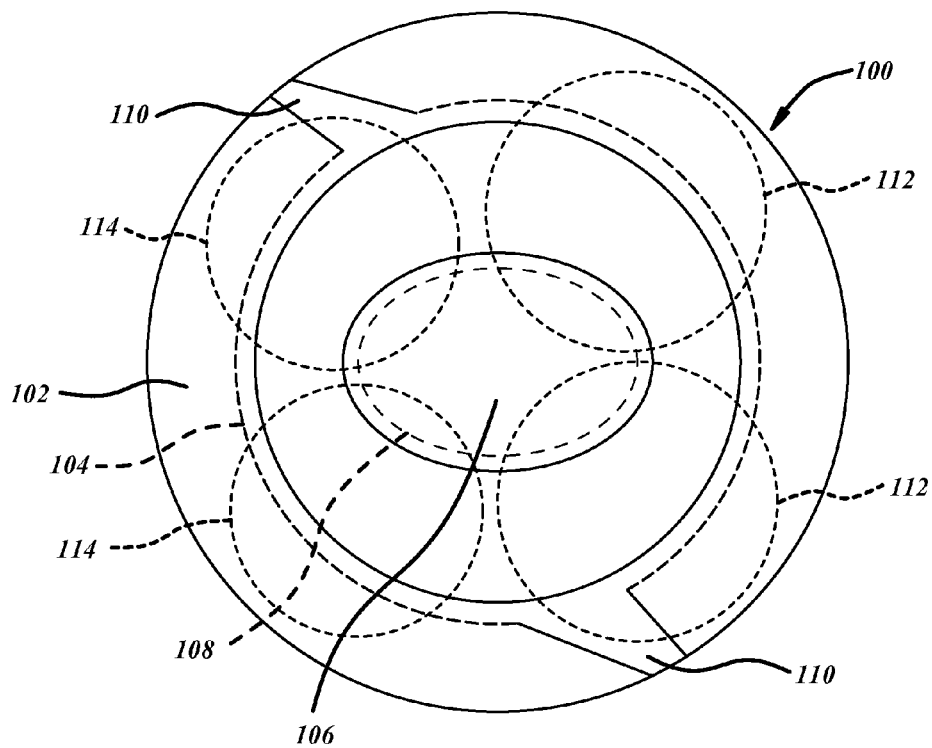
FIG. 6 is an illustration of a piston top of a piston similar to that shown in FIG. 5.

FIG. 6 is an illustration of a piston 100 that is similar to piston 70 of FIG. 5. The squish region 102 is at the periphery. A dashed circle 104 indicates the reentrant edge associated with squish region 102. The center 106 is raised upward from the piston top with the dashed oval 108 indicating another reentrant edge associated with center 106. Pockets 110 are provided for fuel injectors. The poppet valves in the cylinder head are shown projected onto piston 100. Intake valves 112 are slightly larger than exhaust valves 114. In some embodiments, dishes (not shown) in the piston top may be provided to avoid collision of the valves 112, 114 in the piston top. These are often called eyebrows.

In FIG. 6, the projection of the intake and exhaust valves 112, 114 overlaps pockets 110 in piston 100. As pockets 110 are in piston 100 and the valves are in the cylinder head. However, the space needed to accommodate the injector in the cylinder head including the injector, the material into which the injector is installed, and cooling passages, may be greater than can be accommodated in the configuration as shown for some embodiments. In such a situation, the orientation can be adjusted such that fuel injectors are arranged between pairs of adjacent valves. In such a case projections of the intake valves and exhaust valves are rotated with respect to the top of piston.

An advantage of the combustion chamber as shown in FIG. 5 is that the intake and exhaust valves can be larger than with a cylinder head that accommodates a central injector. Cooling raised central portion 73 on piston 70 is a challenge as pistons are cooled by conduction through piston rings and due to oil cooling on the underside. Cylinder heads are water cooled and thus less of a challenge to cool due to forced flow.

Figure 7:
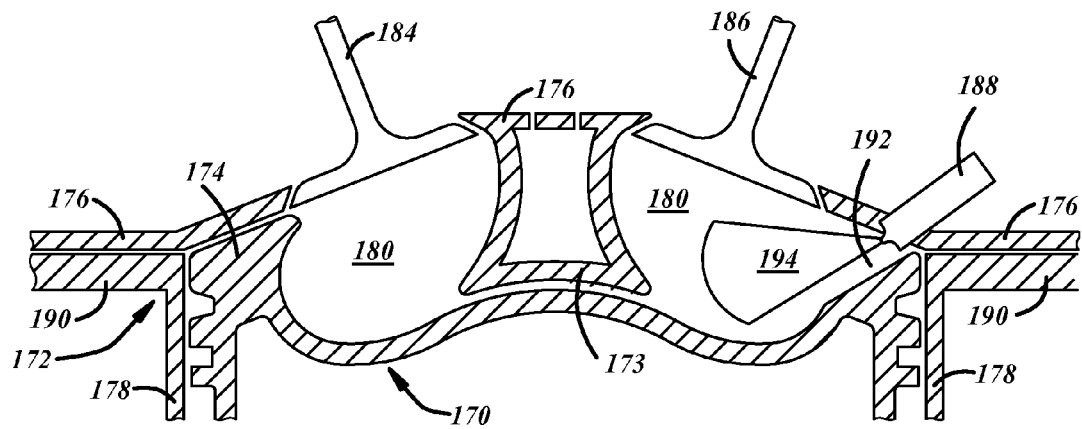
FIG. 7 is a cross section of a toroidal combustion chamber for an engine with one piston in the cylinder and a cylinder head.

In FIG. 7, an alternative combustion chamber shape is shown in which the raised center portion is applied to the cylinder head rather than the piston. A piston 170 reciprocates with a cylinder wall 178 that is part of a block 172. Piston 170 has a squish region 174 at the periphery. When piston 170 is at its closest position to cylinder head 176, the volume in the combustion chamber is largely contained in substantially ovoid regions 180. The combustion chamber is defined by cylinder wall 178, the top of piston 170, and the bottom of cylinder head 176 that opposes piston 70. Cylinder head 176 has a plurality of ports or openings therein into which poppet valves 184, 186 are disposed. Also included in cylinder head 176 is an injector 188. A pocket 192 is provided for jets 194 of injector 188 to access air compressed in regions 180 in piston 170.

Figure 8:
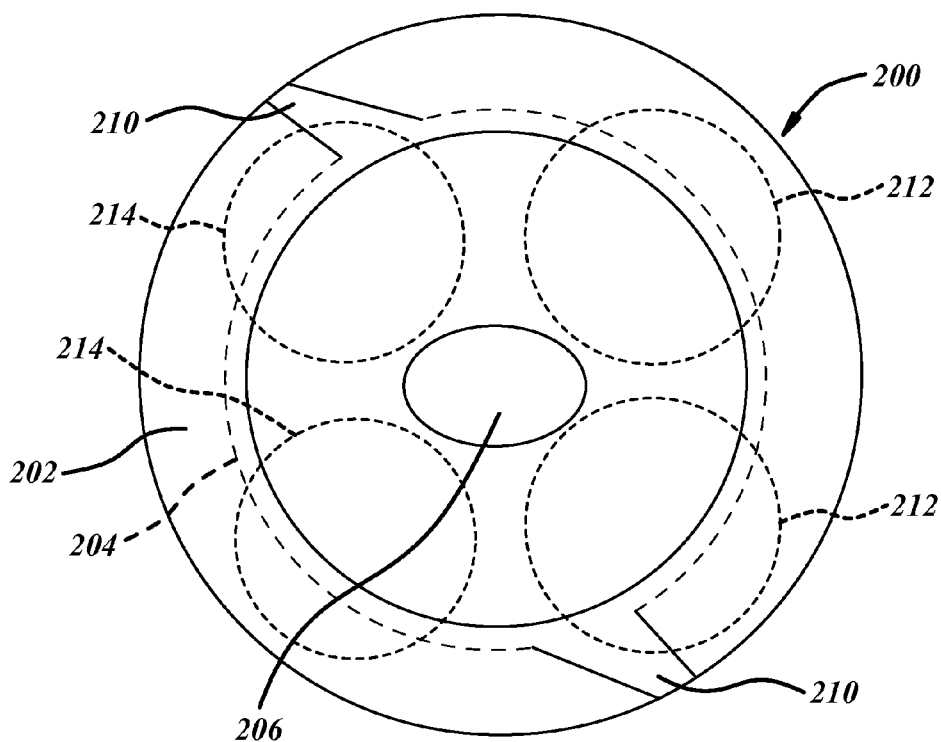
FIG. 8 is an illustration of a piston top of a piston similar to that shown in FIG. 7.

FIG. 8 is an illustration of a piston 200 that is similar to piston 170 of FIG. 7. The squish region 202 is at the periphery. A dashed circle 204 indicates the reentrant edge associated with squish region 202. An oval 206 at the center is a projection of the center region of cylinder head (related to a raised portion 173 of FIG. 7). Pockets 210 are provided for jets exiting the injectors.

Such an alternative has the advantage of having the raised portion 173 being part of cylinder head 176 which can be water cooled. However, a disadvantage of the alternative in FIG. 7 is that raised portion 173 limits the size of valves 184 and 186.

Figure 9:
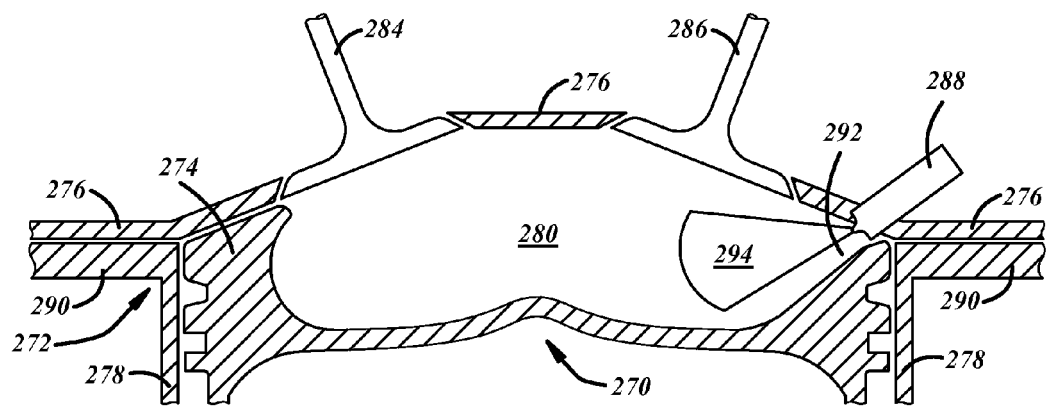
FIG. 9 is a cross section of a toroidal combustion chamber for an engine with one piston in the cylinder and a cylinder head.

In yet another alternative in FIG. 9, the combustion chamber is very similar to combustion conventional combustion chambers except that one or more injectors are side mounted rather than a central injector.

The embodiments described in relation to FIGS. 5, 6, and 9 allow for larger valves than a cylinder head with a central injector. The additional valve area can be applied to the intake valves to allow for: improved breathing, increased swirl, or a combination thereof.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An internal combustion engine, comprising:
    a block defining a cylinder wall;
    a piston disposed within the cylinder wall with a central axis of the piston coincident with a central axis of the cylinder wall, the piston having a top defining three regions: a center region, an outer ring adjacent to an outer periphery of the piston, and an inner ring between the center region and the outer ring, the inner ring recessed in relation to the center region and the outer ring, each of the three regions having a geometric center through which the central axis of the cylinder wall passes;
    a cylinder head affixed to the block over the cylinder wall opposite the top of the piston, the cylinder head defining at least one intake port therethrough with an intake valve disposed therein, at least one exhaust port therethrough with an exhaust valve disposed therein and a projection extending away from the at least one intake port and the at least one exhaust port toward the top of the piston through which the central axis of the cylinder wall centrally passes, the projection having a surface opposite the top of the piston that nearly meets the center region of the piston when the piston is in a top center position within the cylinder wall; and
    an injector disposed in the cylinder head proximate the cylinder wall, the injector having at least one orifice through which a fuel jet exits when the orifice is open, the fuel jet being directed by the injector into the inner ring.

2. The engine of claim 1, wherein a combustion chamber of the engine is defined between the top of the piston, the cylinder wall, and the cylinder head opposite to the top of the piston;

and wherein a volume of the combustion chamber when the piston is in the top center position is substantially defined by a region of the combustion chamber between the inner ring and the cylinder head about an outer periphery of the projection.

3. The engine of claim 2, wherein the volume of the combustion chamber when the piston is in the top center position includes a first volume defined by a first gap between the outer ring of the piston and the cylinder head and a second volume defined by a second gap between the center region of the piston and the projection.

4. The engine of claim 2, wherein the volume of the combustion chamber when the piston is in the top center position is a substantially toroidal volume.

5. The engine of claim 1, wherein the injector is a first fuel injector and the fuel jet is a first fuel jet, the engine further comprising a second fuel injector disposed in the cylinder head at a location approximately diametrically opposed from the first fuel injector, the second fuel injector having at least one orifice through which a second fuel jet exits, the second fuel jet being directed into the inner ring.

6. The engine of claim 1, wherein the cylinder head has two intake ports, two exhaust ports, two intake valves, and two exhaust valves.

7. The engine of claim 1, wherein the outer ring of the piston defines therein a pocket open to the inner ring, the pocket positioned relative to the outer ring to receive the fuel jet from the at least one orifice of the injector when the piston is in the top center position and direct the fuel jet toward the inner ring of the piston.

8. The engine of claim 1, wherein the center region of the piston is oval-shaped.

9. An internal combustion engine, comprising:
a cylinder wall defining a central axis extending centrally therethrough;
a reciprocating piston disposed within the cylinder wall and having a top defining a center region through which the central axis centrally passes, an inner ring about the center region and an outer ring between the inner ring and a periphery of the piston, the inner ring recessed relative to the center region and the outer ring;
a cylinder head mounted over the cylinder wall and defining a first intake port, a first exhaust port, and a projection extending away from an inner surface thereof with the central axis passing centrally through the projection, the cylinder head, the top of the piston and the cylinder wall defining a combustion chamber having a volume which, when the center region of the piston is adjacent to the terminal end of the projection, is substantially defined between the inner ring of the piston and the inner surface of the cylinder head about the projection; and
a first fuel injector disposed in the cylinder head proximate the cylinder wall, the first fuel injector defining at least one orifice through which a first fuel jet passes into the volume defined by the combustion chamber.

10. The engine of claim 9, wherein the center region of the piston is adjacent to the terminal end of the projection when the piston is in a top center position relative to the cylinder wall and the cylinder head,
and wherein the volume of the combustion chamber, when the piston is in the top center position includes, a first volume defined by a first gap between the outer ring of the piston and the inner surface of the cylinder head and a second volume defined by a second gap between the center region of the piston and the terminal end of the projection.

11. The engine of claim 9 wherein the volume of the combustion chamber, when the center region of the piston is adjacent to the terminal end of the projection, is a substantially a toroidal volume.

12. The engine of claim 9, further comprising a second fuel injector disposed in the cylinder head proximate the cylinder wall at a location approximately diametrically opposed from the first fuel injector, the second fuel injector defining at least one orifice through which a second fuel jet passes into the volume defined by the combustion chamber.

13. The engine of claim 9, further comprising:
a first intake valve disposed in the first intake port; and
a first exhaust valve disposed in the first exhaust port.

14. The engine of claim 9, wherein the cylinder head further defines a second intake port and a second exhaust port, the first and second intake ports and the first and second exhaust ports positioned about the projection.

15. The engine of claim 14, further comprising:
a first intake valve disposed in the first intake port;
a second intake valve disposed in the second intake port;
a first exhaust valve disposed in the first exhaust port; and
a second exhaust valve disposed in the second exhaust port.

* * * * *